(12) United States Patent
Heurtier et al.

(10) Patent No.: US 8,779,749 B2
(45) Date of Patent: Jul. 15, 2014

(54) CIRCUIT FOR CONTROLLING AN A.C. SWITCH

(75) Inventors: Jérôme Heurtier, Tours (FR); Samuel Menard, Tours (FR); Amaud Florence, Saint Antoine du Rocher (FR)

(73) Assignee: STMicroelectronics (Tours) SAS, Tours (FR)

( * ) Notice: Subject to any disclaimer, the term of this patent is extended or adjusted under 35 U.S.C. 154(b) by 967 days.

(21) Appl. No.: 12/171,141

(22) Filed: Jul. 10, 2008

(65) Prior Publication Data

US 2009/0015315 A1 Jan. 15, 2009

(30) Foreign Application Priority Data

Jul. 12, 2007 (FR) ...................................... 07 56445

(51) Int. Cl.
*G05F 5/00* (2006.01)
*H01L 29/66* (2006.01)

(52) U.S. Cl.
USPC .......................................... 323/300; 257/119

(58) Field of Classification Search
USPC .................................. 323/300; 257/119–132
See application file for complete search history.

(56) References Cited

U.S. PATENT DOCUMENTS

| | | | | |
|---|---|---|---|---|
| 3,470,436 A | * | 9/1969 | Steele | 318/799 |
| 3,742,295 A | * | 6/1973 | Irie | 315/194 |
| 4,439,688 A | * | 3/1984 | Schornack | 307/115 |
| 4,878,010 A | * | 10/1989 | Weber | 323/300 |
| 5,388,022 A | * | 2/1995 | Ahuja | 361/94 |
| 6,495,996 B1 | * | 12/2002 | Redlich | 323/300 |
| 6,728,320 B1 | | 4/2004 | Khasnis et al. | |
| 2003/0075990 A1 | * | 4/2003 | Guitton et al. | 307/139 |
| 2003/0146717 A1 | * | 8/2003 | Chiang | 315/291 |
| 2005/0082565 A1 | | 4/2005 | Menard et al. | |
| 2006/0039169 A1 | | 2/2006 | Chen et al. | |
| 2006/0120115 A1 | | 6/2006 | Chen et al. | |
| 2007/0052399 A1 | | 3/2007 | Chen et al. | |
| 2007/0052514 A1 | | 3/2007 | Chen et al. | |
| 2007/0153557 A1 | * | 7/2007 | Ochoa | 363/125 |

OTHER PUBLICATIONS

French Search Report dated Apr. 18, 2008 from French Patent Application 07/56445.

* cited by examiner

*Primary Examiner* — Jue Zhang
(74) *Attorney, Agent, or Firm* — Wolf, Greenfield & Sacks, P.C.

(57) ABSTRACT

A circuit for generating a D.C. signal for controlling an A.C. switch referenced to a first potential, from a high-frequency signal referenced to a second potential, including: a first capacitive element connecting a first input terminal, intended to receive the high-frequency signal, to the cathode of a rectifying element having its anode connected to a first output terminal intended to be connected to a control terminal of the switch; and a second capacitive element connecting a second input terminal, intended to be connected to the second reference potential, to a second output terminal intended to be connected to the first reference potential, a second rectifying element connecting the cathode of the first rectifying element to the second output terminal.

9 Claims, 3 Drawing Sheets

CIRCUIT FOR CONTROLLING AN A.C. SWITCH

BACKGROUND OF THE INVENTION

1. Field of the Invention

The present invention relates to electronic circuits and, more specifically, to the control of a switch of a relatively high A.C. voltage by means of a D.C. signal of relatively low amplitude, through an isolation barrier.

An example of application of the present invention relates to control circuits used in electric household appliances (for example, washing machines, ovens, refrigerators, etc.). More generally, the present invention applies to any electric appliance to be controlled from a signal of low-voltage with respect to a high A.C. voltage which supplies it.

2. Discussion of the Related Art

The control of a high-voltage load powered by a high A.C. voltage (for example, the mains voltage of several hundreds of volts) by means of a low-voltage D.C. electronic circuit (at most a few tens of volts) requires an isolation barrier between this electronic circuit and the A.C. switch. Such an isolation barrier is used not only to protect the low-voltage circuit but also to protect the user against possible electrocution when he actuates control elements linked to the electronic circuit. Further, A.C. switches are integrated elements that are bidirectional for both current and voltage, with a control requiring a low-voltage D.C. voltage to restart the switch on each half-wave of the A.C. voltage. These are, for example, triacs or other integrated devices performing the same function. A D.C.-to-D.C. converter with an isolation barrier is then necessary to perform such functions.

Isolation transformers having their primary winding excited by a high-frequency signal (D.C. or A.C. pulse signal) rectified and filtered at the secondary winding are generally used to turn on the A.C. switch. For example, document WO-A-2006/023767 describes a converter using a transformer in an H bridge to generate a power supply isolated from the primary winding. The use of an isolation transformer is bulky and expensive.

Other systems (for example, such as that described in U.S. Pat. No. 6,728,320) use capacitive elements to transmit a control signal between an integrated circuit and an A.C. switch control circuit. Such a transmission, however, only concerns the control set point and requires, on the A.C. switch side, generation of a low supply voltage and thus another transformer to provide the power necessary for the successive switch triggerings.

Optocouplers may also be used, but this poses reliability problems without avoiding the need for a power supply at the secondary.

SUMMARY OF THE INVENTION

An embodiment of the present invention aims at overcoming all or part of the disadvantages of known D.C.-to-D.C. conversion techniques with a galvanic isolation to control an A.C. switch.

An embodiment of the present invention aims at avoiding use of an isolation transformer.

Another embodiment of the present invention aims at providing a low-bulk solution.

To achieve all or part of these and other features, an embodiment of the present invention provides a circuit for generating a D.C. signal for controlling an A.C. switch referenced to a first potential, from a high-frequency signal referenced to a second potential, comprising:

a first capacitive element connecting a first input terminal, intended to receive the high-frequency signal, to a first terminal of a rectifying element having its second terminal connected to a first output terminal intended to be connected to a control terminal of the switch; and a second capacitive element connecting a second input terminal, intended to be connected to the second reference potential, to a second output terminal intended to be connected to the first reference potential, a second rectifying element connecting the first terminal of the first rectifying element to the second output terminal.

According to an embodiment of the present invention, the first terminal of the first rectifying element is its cathode, its anode being connected to the first output terminal.

According to an embodiment of the present invention, the second output terminal is intended to be connected to a power terminal of the A.C. switch.

According to an embodiment of the present invention, the capacitive elements are high-voltage capacitors.

According to an embodiment of the present invention, a capacitance connects the second terminal of the first rectifying element to the second output terminal.

According to an embodiment of the present invention, the high-frequency signal is a D.C. pulse signal.

According to an embodiment of the present invention, the capacitive elements have values of several picofarads.

According to an embodiment of the present invention, the rectifying elements are Schottky diodes.

An embodiment of the present invention also provides a system for controlling the supply of a load with a relatively high A.C. supply voltage by means of a relatively low D.C. voltage, comprising:

at least one A.C. switch connected to the load;
an electronic circuit for supplying the D.C. voltage; and
a circuit for generating a D.C. signal for controlling the A.C. switch.

The foregoing and other objects, features, and advantages of the present invention will be discussed in detail in the following non-limiting description of specific embodiments in connection with the accompanying drawings.

BRIEF DESCRIPTION OF THE DRAWINGS

FIGS. 4A and 4B are timing diagrams illustrating the converter operation on power-on.

DETAILED DESCRIPTION

Figure 1:
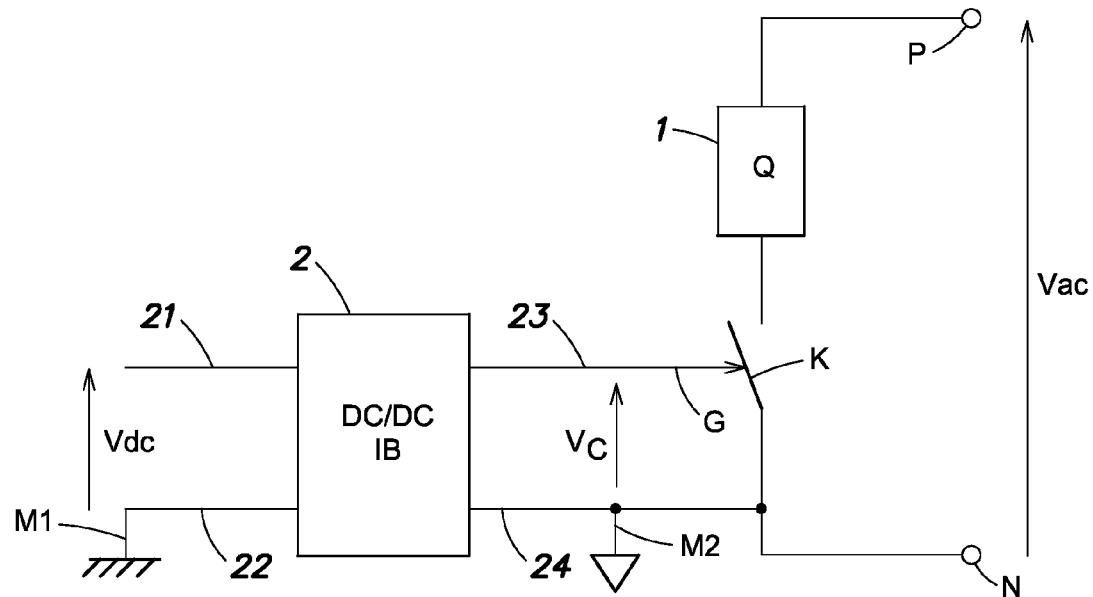
FIG. 1 is a block diagram of a system for controlling an A.C. switch.

The same elements have been designated with the same reference numerals in the different drawings which have been drawn out of scale, especially for the timing diagrams.

For clarity, only those elements useful to the understanding of the present invention have been shown and will be described. In particular, the load controlled by the A.C. switch has not been detailed, the present invention being compatible with any load controlled by such a switch.

FIG. 1 is a block diagram of a system for controlling the supply of a load 1 (Q) with an A.C. voltage Vac of relatively high amplitude and of relatively low frequency (for example, the electrical power distribution system A.C. voltage) by means of an A.C. switch K. Load 1 is series-connected with switch K between two terminals P and N of application of voltage Vac.

Switch K is controlled from a D.C. signal $V_C$ of relatively low amplitude provided by a D.C.-to-D.C. converter 2 (DC/DC IB) to an isolation barrier of a low D.C. voltage Vdc applied between two input terminals 21 and 22. Voltage Vdc is provided, for example, by an electronic circuit, not shown, of microcontroller type. Voltage Vdc is at most of a few tens of volts and preferably smaller than 10 volts. The microcontroller for example receives a control set point originating from an external button that can be handled by a user and/or generates signal Vdc from desired operating cycles programmed for the load. Voltage Vdc is referenced to a voltage M1 while voltage $V_C$ between output terminals 23 and 24 of converter 2 is referenced to a potential M2 different from potential M1.

Figure 2:
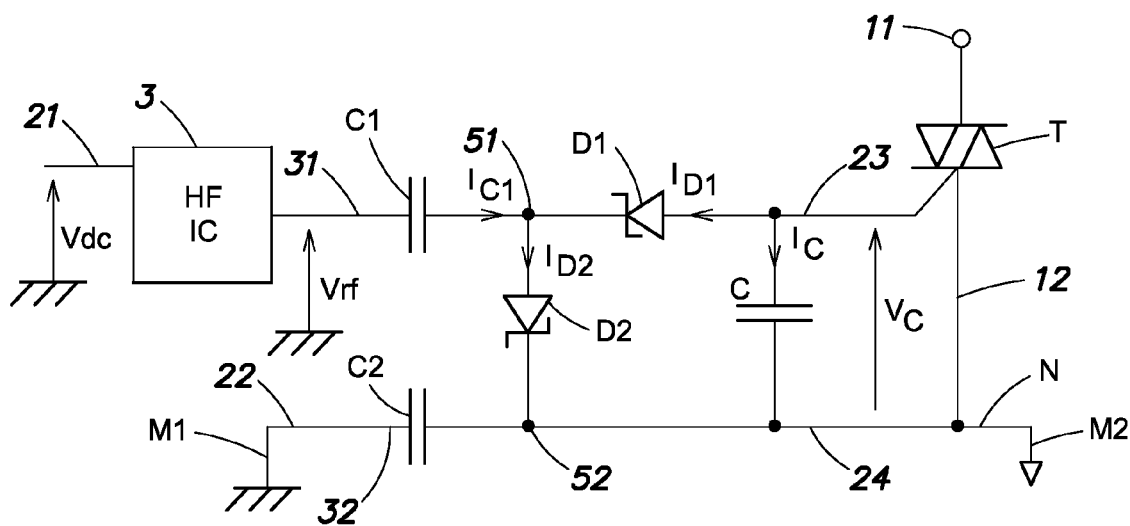
FIG. 2 shows an embodiment of a D.C.-to-D.C. converter for controlling an A.C. switch.

FIG. 2 shows an embodiment of converter 2.

Converter 2 comprises an integrated circuit 3 (HF IC) comprising a radio-frequency oscillator converting D.C. voltage Vdc into a signal Vrf of relatively low amplitude and of relatively high frequency, intended to cross the isolation barrier. The frequency of signal Vrf ranges between several hundreds of kHZ and several GHz. Signal Vrf is a D.C. (non A.C.) pulse signal provided on a terminal 31 and referenced to ground M1 (terminal 22 or 32) of signal Vdc.

Isolation barrier 4 is formed of two high-voltage capacitive elements (standing a voltage of at least 1,000 volts) C1 and C2 having first respective electrodes connected to terminals 31 and 32 and having second respective electrodes connected to input terminals 51 and 52 of a rectifying circuit 5.

Circuit 4 comprises a first diode D1 having its cathode connected to terminal 51 and having its anode connected to output terminal 23 of converter 2, intended to be connected to control electrode G of the A.C. switch. A second diode D2 connects terminals 51 and 52 with its anode on the side of terminal 51. Terminals 52 and 24 are interconnected. Diodes D1 and D2 are sufficiently fast (high frequency) diodes to switch at the rate of voltage Vrf.

In the example of FIG. 2, the A.C. switch is a triac T having its two conduction or power terminals 11 and 12 respectively connected to the load and to one (N) of the terminals of application of A.C. voltage Vac. In order to turn on, a current needs to be extracted from the triac gate on each halfwave of A.C. voltage Vac. As a variation, switch K is an A.C. switch known under trade name "ACS", sold by STMicroelectronics. More generally, any A.C. switch may be used. For example, the A.C. switch is an IGBT transistor or an MBS transistor with a negative or positive control. In the case of a positive control, the biasings of diodes D1 and D2 are reversed.

Control voltage $V_C$ applied to the gate of triac T is smoothed by means of a capacitive element C connecting terminals G and N. Element C may be a capacitor or the intrinsic capacitance of switch T between its terminals G and 12.

Figure 3A:
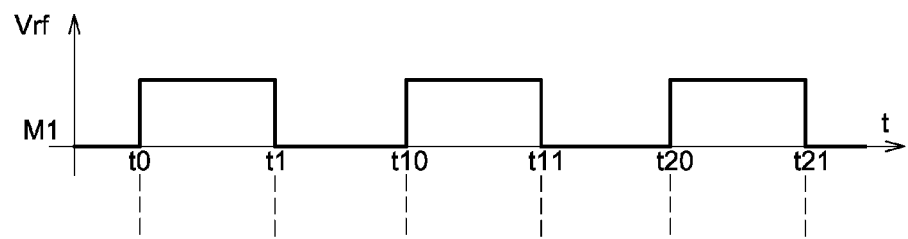
FIGS. 3A, 3B, 3C, 3D, 3E, and 3F are timing diagrams illustrating the operation of the converter of FIG. 2 in steady state.
Figure 3B:
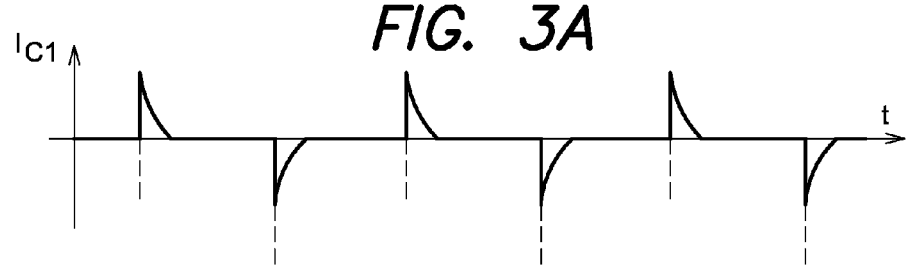
Figure 3C:
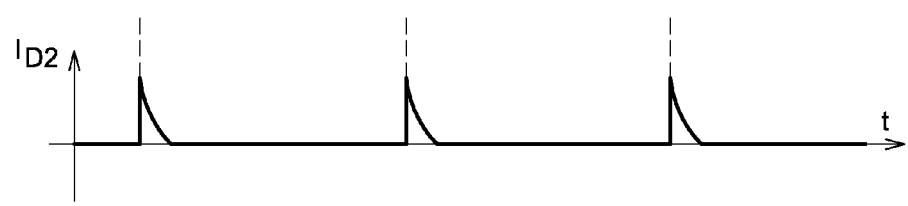
Figure 3D:
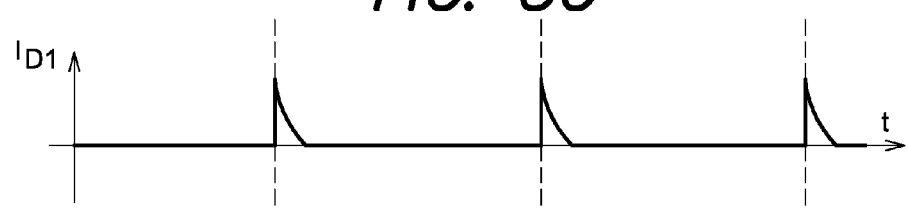
Figure 3E:
Figure 3F:
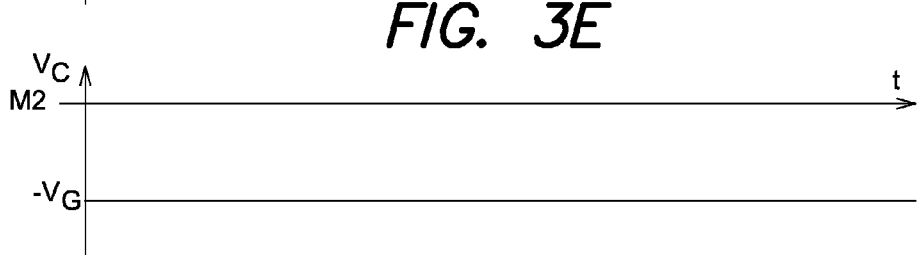

FIGS. 3A, 3B, 3C, 3D, 3E, and 3F illustrate the operation of the circuit of FIG. 2 in steady state. FIG. 3A shows an example of the shape of radio-frequency control signal Vrf. FIGS. 3B to 3E illustrate the respective currents $I_{C1}$, $I_{D2}$, $I_{D1}$, and $I_C$ in capacitive element C1, diode D2, diode D1, and capacitive element C. FIG. 3F illustrates the shape of control voltage $V_C$. The currents and voltages are given with the orientations shown in FIG. 2, assuming a voltage Vrf positive with respect to ground M1.

On each rising edge (times t0, t10, t20, FIG. 3A) of signal Vrf, a positive pulse flows through capacitor C1, diode D2, and capacitor C2. On each falling edge (times t1, t11, t21) of signal Vrf, a negative pulse flows through capacitor C1 via capacitive element C and diode D1. Capacitance C thus charges with a negative voltage with respect to the voltage of node N on each falling edge of signal Vrf, where the power of the rising edges of signal Vrf is not used. Voltage $V_C$ has, in steady state, a level $-V_G$ set by the input characteristic of the power switch.

Figure 4A:
Figure 4B:
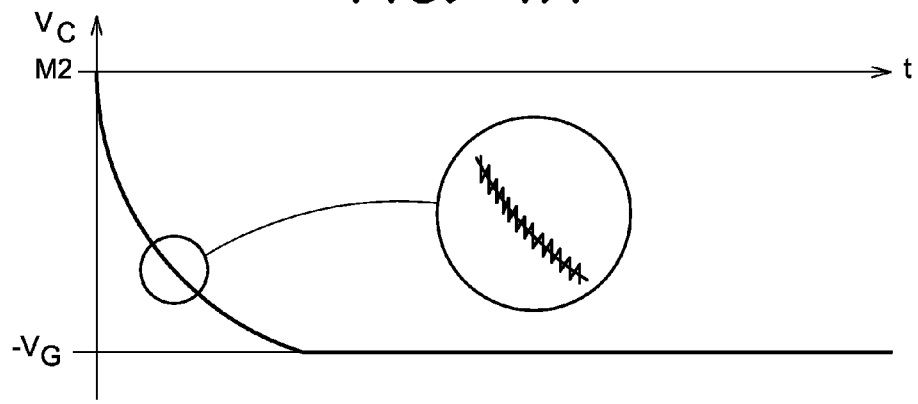

FIGS. 4A and 4B illustrate the system starting. Starting from a zero voltage $V_C$ (FIG. 4B) across element C, the first successive negative pulses of current $I_{C1}$ translate as positive pulses of current $I_C$ negatively charging capacitance C. Voltage $V_C$ thus takes several periods of radio-frequency signal Vrf to reach level $-V_G$ enabling turning on the triac. The higher the frequency of signal Vrf, the shorter this settling time. The lower the capacitances of elements is C1 and C2, the longer this time. In steady state, the power transferred on each falling edge of signal Vrf is sufficient to maintain level $-V_G$.

Figure 5:
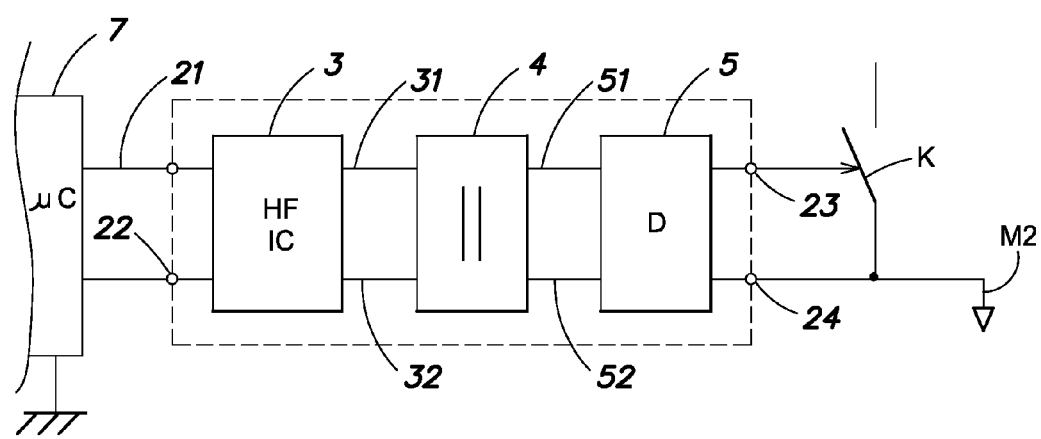
FIG. 5 is a block diagram of a package integrating the circuits forming the converter.

FIG. 5 is a block-diagram illustrating converter 2 integrated in a package 6 gathering its different components, that is, integrated circuit 3 (HF IC), capacitive isolation barrier 4, and rectifying circuit 5 (D). Package 6 then comprises two input terminals 21 and 22 intended for the application of low D.C. control voltage Vdc referenced to ground M1 and originating from a low-voltage electronic circuit 7 (for example, a microcontroller μC), and two output terminals 23 and 24 providing D.C. control voltage $V_C$ of switch K, referenced to ground M2 of high A.C. voltage Vac.

According to a specific embodiment:

capacitive elements C1 and C2 are high-voltage capacitors, each having a value ranging between a few picofarads and a few tens of picofarads (for example, 10 pF);

diodes D1 and D2 are Schottky diodes;

voltage Vrf has an amplitude of approximately 5 volts and a frequency of approximately 1 GHz;

level $-V_G$ is on the order of $-1.2$ volt and current $I_C$ has an amplitude on the order of a few tens of milliamperes.

The obtaining of an isolation voltage from 2,000 to 2,500 volts requires a thickness of a few micrometers of printed circuit type (PCB) isolator between the two electrodes of capacitive elements C1 and C2.

An advantage of the described converter is that it exploits the capacitive barrier to transfer not only the control set point, but also the power.

Another advantage of the converter is that it is particularly simple while reversing the A.C. switch control voltage (voltage $V_C$ is negative with respect to its reference potential M2 while voltage Vrf is positive with respect to its reference potential M1).

Another advantage is that the integrated circuit of generation of signal Vrf may be simplified. Indeed, the use of a pulse transformer would require generation of a sinusoidal signal limited as to its harmonics to a specific frequency linked to the transformer bandwidth. This problem is not posed with the capacitive barrier. Signal Vrf can thus be a D.C. pulse train, which is simpler to generate than an A.C. signal.

Another advantage is that the converter exhibits a good immunity to electromagnetic disturbances. In an embodiment with tracks or conductive planes, the planar electrodes of the capacitances generate less antenna effects than the planar windings of a transformer.

Another advantage is an improved efficiency due to a series resistance of capacitive elements C1 and C2 smaller than the series resistances of the inductive elements of an isolation transformer. This compensates for the loss linked to the lack of recovery of the power of the positive edges of signal Vrf.

Specific embodiments of the present invention have been described. Various alterations and modifications will occur to those skilled in the art. In particular, the selection of the values of the capacitive elements and of the Schottky diodes depends on the application, and especially on the control power required downstream of the isolation barrier. For example, several A.C. switches may be controlled by the same converter. Further, the electronic circuit of microcontroller type upstream of the converter may, as a variation, directly provide high-frequency voltage Vrf.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for controlling a switch, the circuit comprising:
a first capacitive element connected between a first input terminal and a first terminal of a rectifying element, wherein the first input terminal is configured to receive a high-frequency signal of a first amplitude that is referenced to a first potential, and the rectifying element has its second terminal connected to a first output terminal that is configured to be connected to a control terminal of the switch; and
a second capacitive element connected in a parallel circuit branch to the first capacitive element and between a second input terminal and a second output terminal, wherein the second input terminal is configured to be connected to the first reference potential and the second output terminal is configured to be coupled to a second reference potential; and
a second rectifying element connected between the first terminal of the first rectifying element and the second output terminal, wherein the circuit is configured to generate from the high-frequency signal a D.C. signal of a second amplitude at the first output terminal.

2. The circuit of claim 1, wherein the first terminal of the first rectifying element is its cathode, its anode being connected to the first output terminal.

3. The circuit of claim 1, wherein the second output terminal is configured to be coupled to a power terminal of the A.C. switch.

4. The circuit of claim 1, wherein the capacitive elements are high-voltage capacitors.

5. The circuit of claim 1, wherein a capacitance couples the second terminal of the first rectifying element to the second output terminal.

6. The circuit of claim 1, wherein the high-frequency signal is a D.C. pulse signal.

7. The circuit of claim 1, wherein the capacitive elements have values of several picofarads.

8. The circuit of claim 1, wherein the rectifying elements are Schottky diodes.

9. A system for controlling the supply of a load with a high A.C. supply voltage by means of a relatively low D.C. voltage, comprising:
at least one A.C. switch connected to the load;
a first circuit for converting the D.C. voltage into a high-frequency signal of a first amplitude that is referenced to a first potential; and
a second circuit for generating a D.C. signal referenced to a second potential from the high-frequency signal, the D.C. signal for controlling the A.C. switch, the second circuit including:
a first capacitive element configured to couple the high-frequency signal to a cathode terminal of a first rectifying element, the first rectifying element having its anode terminal connected to a control terminal of the at least one A.C. switch,
a second capacitive element connected between the first reference potential and an output terminal connected to a terminal of the at least one A.C. switch and configured to connect to the second reference potential, and
a second rectifying element connected between the first terminal of the first rectifying element and the output terminal.

* * * * *

UNITED STATES PATENT AND TRADEMARK OFFICE
CERTIFICATE OF CORRECTION

PATENT NO. : 8,779,749 B2
APPLICATION NO. : 12/171141
DATED : July 15, 2014
INVENTOR(S) : Jerome Heurtier et al.

Page 1 of 1

It is certified that error appears in the above-identified patent and that said Letters Patent is hereby corrected as shown below:

In the Specification

In column 4, line 18, the word "is" should be deleted.

Signed and Sealed this
Seventh Day of October, 2014

Michelle K. Lee
*Deputy Director of the United States Patent and Trademark Office*